United States Patent [19]

Barnes et al.

[11] 4,292,481
[45] Sep. 29, 1981

[54] DECORATIVE APPLIQUE AND DECORATIVE FACEPLATE ASSEMBLY FOR PUSH-BUTTON TELEPHONES

[76] Inventors: Wayne R. Barnes; Lawrence K. Barnes, both of 207 E. 17th St., New York, N.Y. 10003

[21] Appl. No.: 596,220

[22] Filed: Jul. 16, 1975

[51] Int. Cl.³ ............................................. H04M 1/02
[52] U.S. Cl. .................................................... 179/178
[58] Field of Search ............ 179/178, 179, 184, 90 A, 179/90 K, 100 D, 100 R; 40/337, 336, 10 D, 159

[56] References Cited

U.S. PATENT DOCUMENTS

| | | | |
|---|---|---|---|
| 2,515,820 | 7/1950 | Clark | 40/159 X |
| 2,741,860 | 4/1956 | Van Gieson | 40/336 |
| 3,063,183 | 11/1962 | Long | 40/336 |
| 3,197,573 | 7/1965 | Anson | 179/90 A |
| 3,345,769 | 10/1967 | Nathan | 40/336 |
| 3,445,610 | 5/1969 | Lind | 179/90 K X |
| 3,955,054 | 5/1976 | Hemming et al. | 179/100 D |

*Primary Examiner*—Thomas W. Brown
*Attorney, Agent, or Firm*—Robert E. Burns; Emmanuel J. Lobato; Bruce L. Adams

[57] ABSTRACT

A decorative applique has a profile corresponding to that of standard push-button telephone faceplates and the top surface of the applique contains a decorative design in the form of colors, patterns and the like. Openings are provided in the applique for receiving therethrough the telephone push-buttons thereby enabling the applique to be easily installed over the telephone faceplate. A transparent faceplate assembly is provided with a slot having a shape similar to that of the decorative applique and into which the decorative applique is inserted so that the decorative design is visible through the top of the transparent faceplate assembly.

3 Claims, 4 Drawing Figures

DECORATIVE APPLIQUE AND DECORATIVE FACEPLATE ASSEMBLY FOR PUSH-BUTTON TELEPHONES

BACKGROUND OF THE INVENTION

The present invention relates generally to telephone accessories and more particularly to a decorative applique for use with push-button telephones.

Push-button telephones are becoming increasingly more popular and are in widespread use today in both commercial and residential establishments. There are several basic styles of push-button telephones and for the most part, they differ in the arrangement and number of push-buttons. For example, home phones typically have either ten or twelve basic push-buttons and business phones have, in addition to the ten or twelve basic push-buttons, six additional push-buttons which are used in connection with a plural number of incoming lines and/or intercom stations. The several styles of push-button telephone handsets and housings are available in several different colors and aside from choice of color, the telephones are all similar in appearance.

SUMMARY OF THE INVENTION

It is therefore a principal object of the present invention to provide an accessory for use with push-button telephones which improves the appearance of the telephone and which is available in numerous colors and designs.

It is another object of the present invention to provide a decorative applique for use with push-button telephones so as to impart a contemporary styling to the telephone.

It is a further object of the present invention to provide a decorative applique for use with push-button telephones which may be readily placed over existing telephone faceplates and hence can be installed without any disassembly of the telephone.

It is yet another object of the present invention to provide a decorative applique for use with push-button telephones and which is composed of plastic, natural or synthetic leather, paper, metal or fabric and which is readily attachable to existing telephone faceplates.

A still further object of the present invention is to provide a push-button telephone faceplate assembly composed of a transparent faceplate superposed on a decorative applique so that the decorative design is visible through the faceplate.

It is a still further object of the present invention to provide a push-button telephone faceplate assembly composed of a transparent slotted faceplate having a decorative applique removably received within the slot so that the applique can be readily interchanged with other appliques having different decorative designs.

In its simplest form, one embodiment of the invention comprises a decorative applique having a profile corresponding to that of standard push-button telephone faceplates and having plural openings therein positioned to overlie the corresponding push-button openings in the faceplate. The top surface of the decorative applique is provided with any desired decorative design in the form of colors, fanciful designs, abstract patterns, and combinations thereof so as to match the decor of a home or office. In order to enable ready attachment of the applique onto a telephone faceplate, the undersurface of the applique may contain a pressure-sensitive adhesive or double-stick tape may be used to adhere the applique to the faceplate.

In accordance with another aspect of the invention, a push-button telephone faceplate assembly is provided which comprises a transparent faceplate of standard shape to which is attached a decorative applique. The transparent faceplate is provided with a slot having a shape similar to that of the decorative applique and into which the decorative applique is inserted so that the decorative design is visible through the top of the transparent faceplate.

Additional objects, features and advantages of the invention will become apparent from an understanding of this disclosure which is hereinafter set forth in sufficient detail to readily enable those persons skilled in the art to clearly understand the function, operation and advantages of the invention when read in conjunction with the accompanying drawings.

DETAILED DESCRIPTION OF THE PREFERRED EMBODIMENTS

Figure 1:
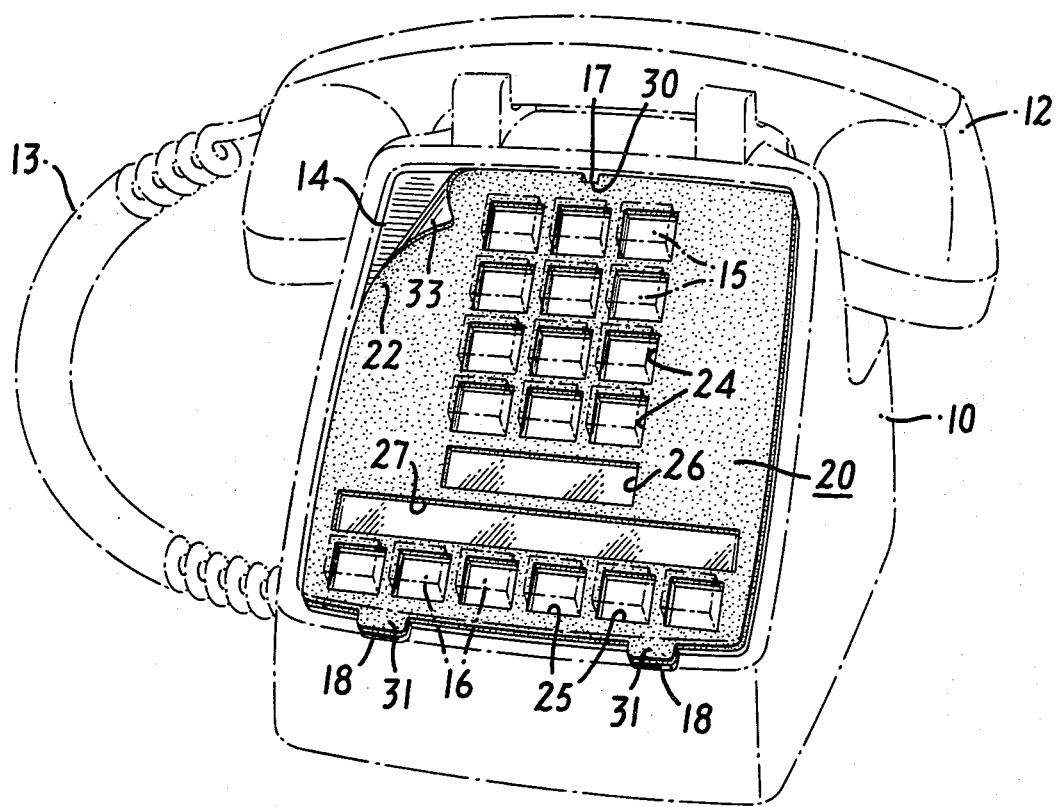
FIG. 1 is a perspective view of one embodiment of the invention showing a decorative applique partly attached to the faceplate of a standard push-button telephone.

The broadest form of the invention is the embodiment shown in FIG. 1 which shows the decorative applique attached to the faceplate of a standard push-button telephone. The push-button telephone is shown in phantom lines and comprises a telephone housing 10 and telephone handset 12 which is connected to the housing by a telephone cord 13. A faceplate 14 is removably attached to the front face of the housing 10 and a set of basic push-buttons 15 project upwardly through openings provided in the faceplate 14. The type of telephone shown in FIG. 1 is a business phone and therefore in addition to the basic push-buttons 15, another set of push-buttons 16 are provided along the base of the phone and these push-buttons likewise extend through corresponding openings in the faceplate 14. In push-button telephones of this general construction, the faceplate 14 is composed of a single piece of plastic having a notch 17 along its upper edge and a pair of tabs 18 along its lower edge. The housing 10 is provided with a pair of slots (not shown) which receive the tabs 18 and a spring detent or the like (not shown) which engages in the notch 17 and in this manner, the faceplate 14 is releasably attached to the housing 10.

The decorative applique of the invention is shown generally by numeral 20 and is configured such that the outer profile thereof corresponds to that of the faceplate 14. The decorative applique 20 comprises a thin integral structure of uniform thickness throughout, as readily seen in the drawings, and may be composed of any suitable material in sheetlike form including plastic, natural or synthetic leather, paper, metal and fabric as well as combinations of these materials. The upper face of the applique is provided with a suitable decorative design which is depicted in the drawing by stippling 22. It is understood that in carrying out the invention, the decorative design may take any form and may be one of color, fanciful patterns such as plaid or geometrical, etc. and for purposes of simplicity of illustration, the design has been shown by way of stippling.

A plurality of openings 24 extend through the applique and are arranged so as to overlie respective ones of the openings in the faceplate 14 through which project the set of basic push-buttons 15 when the applique is mounted on the faceplate. In a similar fashion, the applique 20 is provided with another set of openings 25 arranged to overlie those in the faceplate 14 through which project the other push-buttons 16. Openings 26 and 27 in the form of rectangular windows are also provided in the applique 20 for respectively displaying the telephone number and the intercom station numbers. Thus it may be seen that the decorative applique is contoured so as to fit precisely over the faceplate 14 and suitable openings are provided for receiving the push-buttons and displaying the telephone number and intercom station numbers.

In accordance with one aspect of the invention, means are provided for attaching the decorative applique 20 to the telephone housing 10 and more particularly, to the faceplate 14. Two basic modes of attachment are possible depending upon the desirability of removing the faceplate from the housing in order to attach thereto the applique. Considering first the mode wherein the faceplate 14 is to be removed, the applique may be provided with a notch 30 located so as to overlie the notch 17 in the faceplate 14 and a pair of tabs 31 located so as to overlie the tabs 18 of the faceplate. In order to attach the applique to the faceplate, the faceplate is removed from the housing 10 and the decorative applique 20 is superposed over the faceplate and aligned therewith after which the two are adhered together. For example, an adhesive can be applied to the undersurface of the applique 20 so as to bond the applique to the faceplate 14. Alternatively, an adhesive backing 33 may be provided on the undersurface of the applique and the adhesive backing can comprise pressure-sensitive adhesive or can be in the form of double-stick adhesive tape. After the decorative applique 20 is attached to the faceplate 14, the faceplate is reinstalled on the housing.

Considering the other mode wherein it is not desired to remove the faceplate 14 from the housing in order to effect attachment of the decorative applique 20, it is then necessary to remove the tabs 31 from the applique and such can easily be done by simply cutting off the tabs with a knife, razor, scissors or the like. The applique 20 is then adhered to the faceplate in the same manner as described above. In addition, it is also possible to eliminate the use of an adhesive altogether and maintain the applique in position on the faceplate by the joint holding-action of the push-buttons 15 and 16 which protrude through the openings 24 and 25 of the applique whereby the push-buttons can be used to immovably hold and retain the applique in position. Normally some form of adhesive is required to prevent curling of the applique edges though if the applique possesses sufficient mass and rigidity, such as would be the case if the applique is formed of sheet metal, then the adhesive may not be necessary.

Figure 2:
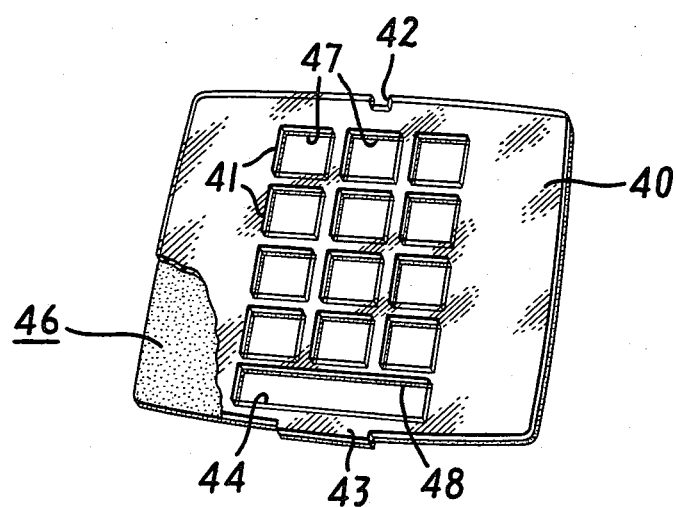
FIG. 2 is a perspective view of another embodiment of the invention showing one variant of a push-button telephone faceplate assembly having the decorative applique superposed beneath a transparent faceplate.
Figure 3:
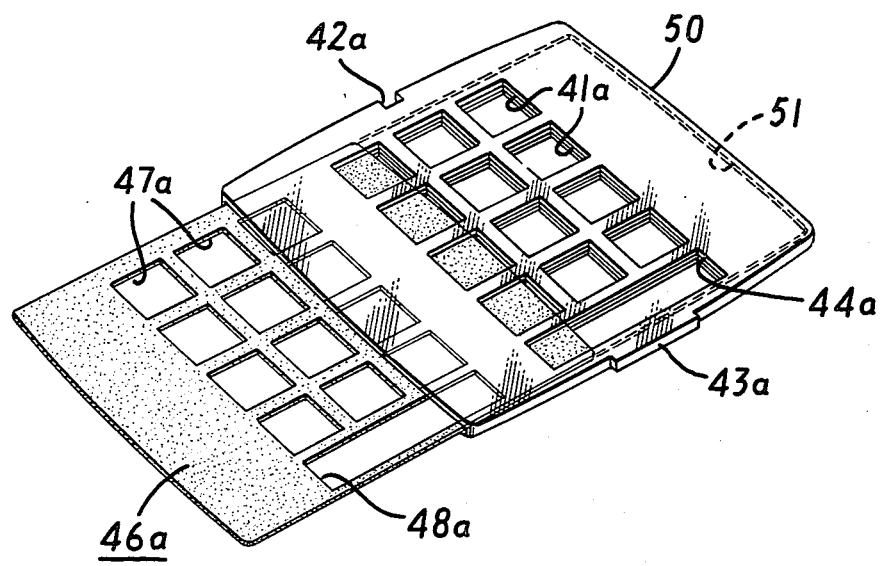
FIG. 3 is a perspective view of another variant of the push-button telephone faceplate assembly wherein the decorative applique is inserted in a slot provided in a transparent faceplate.
Figure 4:
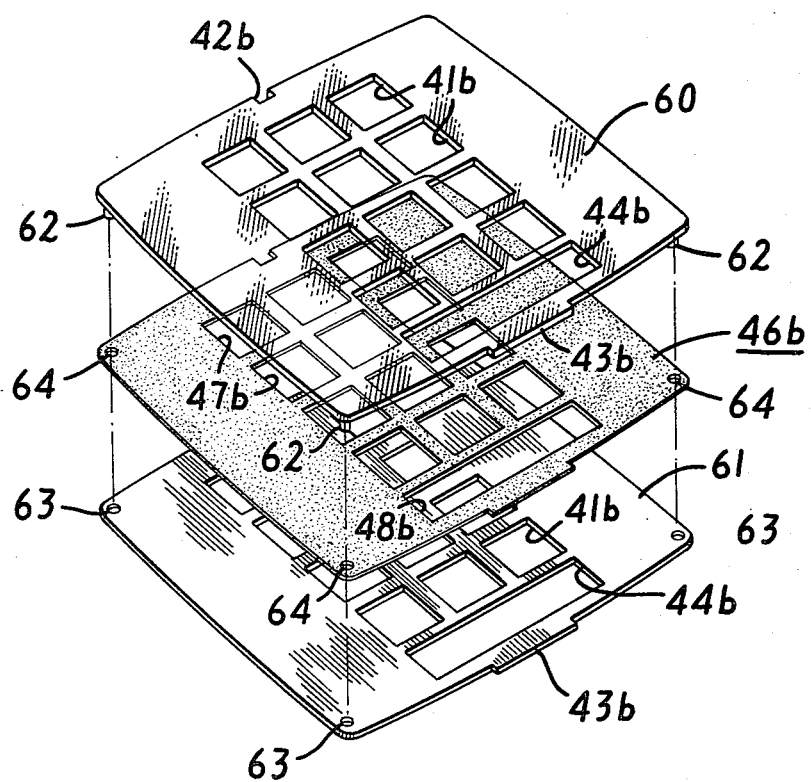
FIG. 4 is an exploded perspective view of another variant of the push-button telephone faceplate assembly wherein the decorative applique is disposed between two transparent sections of a faceplate.

Another embodiment of the invention is shown in FIGS. 2-4 and in this embodiment, the decorative applique is combined with a transparent faceplate to form a push-button telephone faceplate assembly. For purposes of explanation, this embodiment is described with reference to a faceplate construction of the type commonly found on push-button telephones for home use though it is equally applicable to business phones as well. One variant of the faceplate assembly is shown in FIG. 2 and comprises a transparent faceplate 40 having generally square openings 41 therein for receiving the telephone push-buttons. A notch 42 is provided along the upper edge of the faceplate and a tab 43 is provided along its lower edge and the notch and tab function in a manner analagous to the notch 17 and tabs 18 of the faceplate 14 shown in FIG. 1. An opening 44 in the form of a rectangular window is also provided in the faceplate 40 for purposes of displaying the telephone number. The transparent faceplate 40 is composed of transparent or partially transparent plastic material so that the decorative design of the applique may be visible therethrough.

A decorative applique 46 is attached to the underside of the faceplate 40 and the upper surface of the applique is provided with a suitable decorative design. For purposes of illustration, the decorative design is shown as stippling and it is understood that any desired design may be contained on the upper surface of the applique 46. A series of generally square openings 47 and a rectangular opening 48 extend through the applique and are located in alignment with the openings 41 and 44, respectively, which are provided in the transparent faceplate 40. The applique is attached to the transparent faceplate in the same manner as that described above with respect to the embodiment of FIG. 1 so as to form a push-button telephone faceplate assembly.

Another variant of the push-button telephone faceplate assembly constructed according to the principles of the present invention is shown in FIG. 3 and those parts corresponding to parts shown in FIG. 2 are similarly numbered with the additional suffix "a". In this variation, a transparent faceplate 50 is provided with an elongated slot 51 dimensioned to receive therein the decorative applique 46a. The elongated slot 51 is shaped similar to that of the peripheral edge of the applique 46a so that the applique fits snugly within the slot. In all other respects, the transparent faceplate 50 is similar to that of the transparent faceplate 40 of FIG. 2.

An advantage of this variation is that no additional means is needed for attaching the applique to the faceplate and the applique is retained in position by the confinement of the faceplate 50 and also by the holding action of the push-buttons which project through the openings 47a which are provided in the applique for this purpose. Another advantage of this variation is that it enables simple removal and exchange of the applique 46a with another applique having a different decorative design. In order to effect an exchange of appliques, the transparent faceplate 50 is removed from the telephone housing, the decorative applique 46a is removed and another is inserted in its place, and then the faceplate assembly is reinstalled on the housing.

A further variant of the faceplate assembly constructed in accordance with the principles of the invention is shown in FIG. 4. In this variation, the transparent faceplate is formed in two half-sections 60 and 61 and a decorative applique 46b is sandwiched between the two sections. It is only necessary that the upper section 60 be transparent though for ease of manufacture, both sections can be composed of the same material. In order to attach the two sections together, four pins 62 are provided on the undersurface of the top section 60 and corresponding holes 63 are provided in the lower section 61 for receiving the pins. The pins 62 are preferably over-sized with respect to the holes 63 so that they fit therein with a tight fit thereby retaining the two half-sections together. It is recognized, of course, that the pins and holes may be reversed so that the upper section 60 is provided with the holes and the lower section 61 contains the pins. Also, other means may be employed to releasably connect together the two sections.

In the particular arrangement shown in FIG. 4, the decorative applique 46b is likewise provided with holes 64 at each corner thereof for receiving therethrough the pins 62. In this fashion, the applique is correctly locked in position during assembly of the faceplate assembly and the locking or holding action of the push-buttons is not needed to retain the applique in position. The remaining parts of the faceplate assembly are similar to that shown in FIG. 2 and are similarly numbered with the additional suffix "b".

With respect to the embodiment of the invention shown in FIGS. 2-4, it is also envisioned that the faceplate may have opaque portions so that only selected areas of the decorative applique are visible through the faceplate. For example, the faceplate may have a pattern of opaque portions and transparent portions thereby supplementing the decorative design contained on the applique. Also, the faceplate may be partially transparent or translucent so that the decorative design on the applique cannot be clearly distinguished so that the decorative design appears hazy and diffused when viewed through the faceplate.

Numerous other modifications and changes will become apparent to those skilled in the art and the present invention is intended to cover all such obvious modifications and changes which fall within the spirit and scope of the invention as defined in the appended claims.

We claim:

1. A decorative faceplate assembly for a push-button telephone comprising: a transparent faceplate configured for use on a push-button telephone and having plural openings therein located so as to overlie respective ones of the telephone push-buttons when the faceplate assembly is installed on a push-button telephone, said transparent faceplate having therein a slot dimensioned to receive a decorative applique; and a decorative applique removably inserted into said slot and containing on the top surface thereof a decorative design which is visible through said transparent faceplate and having plural openings therein superposed over respective ones of the plural faceplate openings.

2. A decorative faceplate assembly according to claim 1; wherein the faceplate slot extends substantially the entire length and width of said faceplate and is configured relative to said decorative applique so as to confine and thereby removably maintain said decorative applique therewithin.

3. A decorative faceplate assembly according to claim 1; wherein said applique comprises a thin integral structure of uniform thickness throughout.

* * * * *